(12) United States Patent
Cintula

(10) Patent No.: US 10,378,643 B2
(45) Date of Patent: Aug. 13, 2019

(54) PLANETARY DRIVE COMPRISING A PLANET CARRIER

(71) Applicant: SCHAEFFLER TECHNOLOGIES AG & CO. KG, Herzogenaurach (DE)

(72) Inventor: Marian Cintula, Myjava (SK)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/532,599

(22) PCT Filed: Nov. 17, 2015

(86) PCT No.: PCT/DE2015/200505
§ 371 (c)(1),
(2) Date: Jun. 2, 2017

(87) PCT Pub. No.: WO2016/086931
PCT Pub. Date: Jun. 9, 2016

(65) Prior Publication Data
US 2017/0335947 A1 Nov. 23, 2017

(30) Foreign Application Priority Data
Dec. 3, 2014 (DE) .................... 10 2014 224 755

(51) Int. Cl.
*F16H 57/08* (2006.01)
*B21D 53/28* (2006.01)
*B23P 15/14* (2006.01)

(52) U.S. Cl.
CPC ........... *F16H 57/082* (2013.01); *B21D 53/28* (2013.01); *B23P 15/14* (2013.01)

(58) Field of Classification Search
CPC ........... F16H 2057/02017; F16H 57/08; F16H 57/082; F16H 1/2827; F16H 1/2836;
(Continued)

(56) References Cited

U.S. PATENT DOCUMENTS 1,743,943 A * 1/1930 Wagner .................. F16H 55/10
29/893.2
3,527,121 A * 9/1970 Moore .................. F16H 57/082
475/282
(Continued)

FOREIGN PATENT DOCUMENTS

DE 117271 1/1976
DE 10203880 A1 4/2003
(Continued)

OTHER PUBLICATIONS

Abstract for GB 1205009 A (Year: 1970).*
International Search Report for International Application No. PCT/DE2015/200505 dated Feb. 9, 2016.

*Primary Examiner* — Jeffrey A Shapiro
(74) *Attorney, Agent, or Firm* — Brooks Kushman P.C.

(57) ABSTRACT

A planetary drive includes a planet carrier and planetary gears. The carrier includes two axially-facing carrier plates and at least one connecting element. The connecting element is a linear strip of metal that is bent to take the shape of a cylinder for assembly. The strip of metal connects the two carrier plates while maintaining them in a spaced apart relationship. The strip includes a plurality of openings or holes for receiving a part of the planetary gears as they rotate. The strip is a separate element from the carrier plates, but is assembled to and between the plates.

12 Claims, 6 Drawing Sheets

(58) Field of Classification Search
CPC ....... F16H 2001/2872; F16H 2001/325; F16H 2001/326; F16H 2048/085
USPC .............................. 29/893.1, 893.2; 475/331
See application file for complete search history.

(56) References Cited

U.S. PATENT DOCUMENTS

| | | | | |
|---|---|---|---|---|
| 4,414,902 | A * | 11/1983 | Strasser | B60R 21/2644 |
| | | | | 102/370 |
| 4,793,214 | A * | 12/1988 | Nurnberger | B62M 11/14 |
| | | | | 29/893.1 |
| 6,609,993 | B2 | 8/2003 | Ohkubo et al. | |
| 6,863,636 | B2 * | 3/2005 | Huber | F16H 57/082 |
| | | | | 29/893 |
| 6,931,959 | B2 * | 8/2005 | Giuriati | F16H 57/082 |
| | | | | 475/331 |
| 6,986,726 | B2 * | 1/2006 | Simon | F16H 3/663 |
| | | | | 475/340 |
| 8,307,960 | B2 * | 11/2012 | Seuser | B60T 13/746 |
| | | | | 188/156 |
| 8,574,119 | B1 * | 11/2013 | Kinter | F16H 57/082 |
| | | | | 475/331 |
| 8,585,536 | B2 * | 11/2013 | Norem | F16H 57/082 |
| | | | | 475/331 |
| 8,900,089 | B2 * | 12/2014 | Mizuno | F16H 57/082 |
| | | | | 475/331 |
| 9,145,967 | B2 * | 9/2015 | Fox | F16H 57/082 |
| 9,434,032 | B2 * | 9/2016 | Basin | B23P 15/14 |
| 2001/0018381 | A1 * | 8/2001 | Suzumura | F16H 57/082 |
| | | | | 475/331 |
| 2004/0077455 | A1 * | 4/2004 | Huber | F16H 57/082 |
| | | | | 475/331 |
| 2005/0132556 | A1 * | 6/2005 | Bobed | D06F 37/04 |
| | | | | 29/505 |
| 2005/0192151 | A1 * | 9/2005 | Simon | F16H 3/663 |
| | | | | 475/331 |
| 2007/0010365 | A1 * | 1/2007 | Schmitt | F16H 57/0479 |
| | | | | 475/159 |
| 2007/0111846 | A1 * | 5/2007 | Metten | F16H 57/0479 |
| | | | | 475/331 |
| 2011/0009233 | A1 * | 1/2011 | Mizuno | F16H 57/082 |
| | | | | 475/331 |
| 2011/0160015 | A1 * | 6/2011 | Ren | B60K 6/442 |
| | | | | 475/5 |
| 2013/0053203 | A1 * | 2/2013 | Smetana | F16H 57/082 |
| | | | | 475/159 |
| 2013/0252777 | A1 * | 9/2013 | Biermann | F16H 48/05 |
| | | | | 475/221 |
| 2014/0200109 | A1 * | 7/2014 | Stocco | F04C 2/084 |
| | | | | 475/331 |
| 2015/0111685 | A1 * | 4/2015 | Biermann | F16H 48/11 |
| | | | | 475/248 |

FOREIGN PATENT DOCUMENTS

| | | | |
|---|---|---|---|
| DE | 60011384 T2 | 6/2005 | |
| DE | 102007042801 A1 | 3/2009 | |
| DE | 112009000602 B4 | 1/2013 | |
| GB | 1205009 A * | 9/1970 | ............... F16H 3/44 |
| GB | 2183001 A1 | 5/1987 | |
| JP | 2004347059 A | 12/2004 | |

* cited by examiner

PLANETARY DRIVE COMPRISING A PLANET CARRIER

CROSS-REFERENCE TO RELATED APPLICATIONS

This application is the U.S. National Phase of PCT Appln. No. PCT/DE2015/200505 filed Nov. 17, 2015, which claims priority to DE 102014224755.1 filed Dec. 3, 2014, the entire disclosures of which are incorporated by reference herein.

TECHNICAL FIELD

This disclosure relates to a planetary drive comprising a planet carrier and planetary gears, wherein the planet carrier is formed by two opposing carrier elements and at least one connecting element, and wherein the carrier elements are axially connected to one another by means of the connecting element, wherein the planetary gears are supported at a radial spacing to an axially oriented central axis of the planetary drive, and axially between the carrier elements in the planet carrier on the carrier elements, such that they protrude radially beyond the connecting element through radial through holes in the planet carrier. This disclosure also relates to a method for producing a planetary drive of this type. Furthermore, this disclosure relates to a planet carrier for a planetary drive of this type, and a method for producing the planet carrier.

BACKGROUND

Planetary drives are used, for example, in vehicle transmissions. DE60011384T2 shows a generic planetary drive in which the connecting element has a single-piece design, and is a ring, having a crenellated design on both sides. The ring is connected to lateral carrier elements through welding, for example. For this, the ring is disposed axially between the carrier elements. On one side, the ring placed with the upper surfaces of the crenellations on a carrier element, and attached there. On the other side, the ring is placed with the upper surfaces of the other crenellations on the other carrier element and attached there, e.g. by welding. The intermediate spaces between the crenellations are delimited by the ring in one axial direction and in the direction of the circumference, and by the carrier element in the other axial direction. This results in the formation of through holes. Planetary gears protrude out of the through holes, beyond the outer contour of the connecting element when the planetary drive is assembled, in order to become engaged with a ring gear, for example. The production of the ring is complicated, and thus associated with high costs.

DE 117 271 A1 describes the production of a planet carrier, the connecting elements of which are produced individually as flat or curved hollow cylinder segments made of metal sections and flat materials. In the assembly of the planet carriers, each individual connecting element is connected to carrier plates.

DE 10 2007 042 801 A1 describes a planet carrier, the body of which is substantially formed by a tube-shaped element and two flanges. The tube-shaped element has a complex design. It is constricted at a middle part, and provided with through holes. Planetary gears protrude out of the through holes on the installed planetary drive. The constriction provides inner stops on the left and right of the middle, on which the flanges bear. The flanges support the planet bolts on the assembled planetary drive, on which the planetary gears are rotatably supported. The tube-shaped element is furthermore provided with teeth, in which disks of multi-disk clutches are inserted, for example, on the completed planetary drive. The tube-shaped element is produced, for example, through deep drawing and rolling, from a tube-shaped blank.

A planet carrier is described in DE 11 2009 000 602 B4, which is formed by two carrier parts. One carrier part has integrated flaps, which are curved in the axial direction, thus forming connecting elements between the carrier parts.

DE 102 03 880 A1 shows a planetary drive in which the planet bolts, on which the planetary gears are rotatably supported, are simultaneously the connecting elements between the carrier plates of the planetary drive. The carrier plates are provided with through holes for this, through which one end of a planet bolt can be inserted from the inside through a carrier plate in each case, and can be widened on the other side of the carrier plate to secure it there.

SUMMARY

The object of this disclosure is to create a planetary drive and a planet carrier that can be produced easily and inexpensively.

The object is achieved according to the subject matter of the claims.

The connecting element is at least one metal strip, in the form of a hollow cylinder with a closed circumference, and curved about the central axis, having two ends facing one another in the direction of the circumference.

The central axis of the planetary drive according to this disclosure is the longitudinal axis about which the planetary gears orbit on planet tracks, and about which the planet carrier rotates. The axial direction is determined for the planetary drive according to this disclosure, and for its planet carrier, by the longitudinal direction, thus by the course and the direction of the central axis. Accordingly, the radial direction is the direction perpendicular to the central axis and extending away from the central axis.

The metal strip is connected to both carrier elements. As a result, the carrier elements are connected to one another via the metal strip. The planetary gears of the planetary drive protrude radially out of the through holes beyond the planet carrier when the planetary drive is assembled.

The metal strips can have an arbitrary design, e.g. in the shape of a comb, or having a meandering course. One embodiment of this disclosure provides that the metal strip is formed by a perforated strip.

One embodiment of the disclosure provides that the through holes are encompassed by the material of the metal strip in the circumferential direction and in an axial direction toward a carrier plate. In the other direction, the respective radial through hole is delimited by the structure of the other carrier element.

The cross webs oriented as teeth of a metal strip shaped on one side in the manner of a comb, are oriented in axially opposing directions between the carrier elements. With a metal strip shaped on one side in the manner of a comb, a circumferential lateral edge that connects the teeth is disposed on one side of the teeth, either the left or right, such that it is connected on one side of the planetary drive to a carrier element in the direction of the circumference, around the central axis. On the other side of the planetary driver, the teeth lie directly at their ends, or tips, against the other carrier element, and are each connected thereto. The metal strip thus has a lateral edge on only one side of a carrier element. The radial interruptions for the planetary gears are delimited in one axial direction by the lateral edge, in each circumferential direction by a tooth, and in the other axial direction by the carrier element.

With a metal strip shaped in the manner of a comb on both sides, a middle web runs between the carrier elements. As a result, there is no encompassing lateral edge. There are two rows of cross webs, or teeth, respectively. The teeth of the one row extend outward from the middle web toward one of the carrier elements in an axial direction, and are attached to this carrier element. The teeth of the other row are directed outward from the middle web toward the other carrier element, in the opposite axial direction, and attached thereto. The teeth can be disposed opposite one another on the middle web, or offset. The teeth are disposed opposite one another when a tooth of one row is oriented such that it is axially aligned with a tooth of the other row. If they are offset, the teeth are disposed such that a tooth of one row lies axially opposite a through hole on the other side of the middle web in each case. In this manner, radial through holes are obtained on both sides of the middle web, which are oriented either axially to one another, or alternatively, offset in an arbitrary manner to one another in the direction of the circumference.

The metal strip having a meandering course is structured such that there are alternating radial through holes in the circumferential direction. One through hole is delimited on the left by a left-hand lateral edge of the metal strip and on the right by the carrier element. The next through hole is delimited on the left by the carrier element and on the right by a right-hand lateral edge. A cross web runs between two adjacent through holes on the circumference, via which a left-hand lateral edge is connected to a right-hand lateral edge in each case.

With the preferred perforated strip, the through holes are formed as perforations in the metal strip, and encompassed by the material of the metal strip. The inner contour of the perforation is thus formed at the edge by the material of the metal strip in both the axial directions a well as the circumferential directions. The metal strip has curved lateral edges on both sides in the circumferential direction in this case, between which axially oriented cross webs run, wherein the cross webs and the axially opposed lateral edges are connected to one another in an integral manner by the material of the metal strip.

Lateral edges, middle and cross webs have an arbitrary design. The through holes have sharp-edged or rounded contours.

The metal strip is preferably flat in its initial state. The disclosure provides a method for producing a connecting element in the form of the metal strip. The metal strip is preferably cut from a band. The band material is flat or profiled. When the band material is flat, its width preferably corresponds to the with of the metal strip, or the connecting element, respectively. The cutting length of the metal strip corresponds thereby to the circumference of the completed connecting element. The band material can alternatively be designed as a profiled flat material. The band material preferably has a width that corresponds to the axial width (the height of the hollow cylinder) of the completed metal strip. Alternatively, the metal strip can also be stamped out of arbitrary metal blanks. The structures for the through holes, or the completed perforations in the metal strip, for the planetary gears are preferably formed prior to cutting the metal strip, or after cutting it, preferably through stamping. The metal strip is also processed, selectively, by embossing or profiling in this state.

The metal strip obtains its final curved shape after being cut to size, in that it is curved over a cylindrical mandrel, and retained in the form of a cylinder with splits. The ends of the metal strip are brought together thereby, thus forming the hollow cylinder, and connected to one another in a form fitting and/or material bonded manner. The curved final shape of the metal strip is substantially cylindrical, but does not exclude holes or lateral teeth for creating the through holes (in the comb-like or meandering course designs) and arbitrary profiles. The completed connecting element is connected to the carrier elements in a form and/or force fitting manner.

The advantage of the disclosure is that the connecting elements can be produced inexpensively from metal strips, with lowest possible material losses, in particular in mass production.

The production of individual adjacent connecting elements on the circumference, such as is known from the aforementioned prior art, and the disadvantages associated therewith are eliminated thereby.

As described above, planet carriers exist that have individual connecting elements produced as curved hollow cylinder segments made of metal sections and flat material. For this, the connecting elements must be brought into their curved shapes, corresponding to hollow cylinder segments, after they have been cut from the sheet metal. By way of example, one disadvantage with this is that the individual connecting elements tend to "spring open" after they have been ejected form the bending and shaping tool, and accordingly have an imprecise shape. A hollow cylinder, in contrast, which is used as a connecting element on the planetary carrier according to the disclosure, remains stable in terms of its shape after it has been curved and the ends have been subsequently welded together, and can be produced such that it is precisely round. Moreover, the effort required for producing the planet carrier according to the prior art is already extensive, because numerous individual parts must be produced, while in contrast, only three individual parts are needed for producing the planet carrier according to the disclosure per se.

The planet carrier according to the disclosure can advantageously be produced in a cost-effective manner.

Another advantage of the disclosure is that the stiffness of the planet carrier and the planetary drive is increased because the through holes are delimited by the material of the metal strip on all sides, and the connection between the carrier elements is thus more robust. It is thus possible, for example, to connect the carrier elements and the metal strip to one another via circumferential welding seams that are continuous over the circumference. Moreover, additional bolt-like connecting elements can be used. A particular advantage of the disclosure is obtained in this sense, in particular with respect to the planet carriers described in the section, in that the planet bolts are used as connecting elements between the carrier plates.

The carrier elements can have arbitrary shapes, e.g. hollow cylindrical shapes or bowl-like shapes, and can be produced from arbitrary materials. One embodiment of the disclosure provides that the carrier elements are circular disk-shaped and perforated carrier plates made of sheet metal, which are preferably produced through stamping from steel sheet metal. The advantage of the disclosure is that carrier parts of this type can be produced inexpensively. In this sense, the carrier parts are also designed, selectively, as identical parts. The advantage of the disclosure is that with the production of the individual parts of the planet carrier, e.g. in comparison to the planet carriers of the prior art cited above, the carrier parts of which include the connecting elements as an integral part thereof, there is less, or very little waste material from the sheet metal cutting.

Another embodiment of the disclosure provides that the connecting element rests on the outside on a cylindrical outer contour of the respective plate, and has a inner cylindrical contour on the interior for this. Alternatively, the metal strip is place on the respective carrier element at its end surface, and connected thereto. The connections are produced by form fitting or material bonded elements. Methods for attaching the connecting element/metal strip are rolling or welding procedures, insertion or riveting procedures, or combinations thereof. The connection is particularly robust, and the carrier plates are oriented precisely to one another.

The disclosure provides a method for producing an exemplary embodiment of a planet carrier according to the disclosure. The planet carrier is produced from the carrier plates, the metal strip, and connecting bolts. The carrier plates are stamped with two types of perforations. One type is provided for receiving the connecting bolts. In the other type, the planet bolts are supported in a fixed or rotatable manner, or pins from planetary gears are rotatably supported therein. The connecting bolts are either installed simultaneously with the carrier plates, or inserted into the perforations after the perforations of the first type in both carrier plates have been aligned with one another. In order to produce a planetary drive having a planet carrier of this type, the planetary gears and the planet bolts can be subsequently placed in the completed planet carrier.

The production of a planet carrier according to the disclosure is simple and cost-effective, while in contrast, for the planet carrier described in the section, having tube-shaped bodies, tube-shaped rod material is used as the unfinished product (starting material). These require a lot of storage space. In contrast, flat sheet metal materials or bands wound in a coil can be used for the production of the planet carrier according to the disclosure, which require less storage space. The production of the planet carrier according to the prior art with tube-shaped bodies is complex and expensive. For the production thereof, tube blanks must first be cut from rod material, which are then widened, profiled and perforated. Numerous complicated tools or devices are needed for the production. In contrast, with the production of the hollow cylindrical connecting element of the planet carrier according to the disclosure, a device can be used that can also be retooled for other types, in which the metal strips can be simultaneously or successively cut to length, stamped, embossed, curved, and welded together at the ends.

The disclosure furthermore provides a method for producing a planetary drive having a planet carrier designed according to the disclosure. In one method step, the carrier elements are placed in the completed hollow cylindrical metal strip, or mounted thereon, at an axial spacing to one another. The perforations of the carrier plates are aligned to one another thereby, such that their axes of symmetry are aligned axially. The perforations are provided for receiving the planet bolts and/or connecting bolts. The planetary gears are subsequently placed and positioned in the planet carrier such that their axes of rotation are axially aligned with the axes of symmetry of the opposing perforations. The planet bolts are then installed in the planet carrier. For this the respective planet bolts are inserted through one of the perforations, into the hole in the planetary gear, through this hole, and inserted or pressed into the opposite perforation. The completed planet carrier is populated in this case with planetary gears, which are, selectively, supported in a sliding manner on the respective planet bolts, or supported in a rotating manner on the planet bolts via one or more roller bearings. For this reason, one embodiment of the disclosure provides that at least one roller bearing is placed therein, prior to positioning the respective planetary gear.

BRIEF DESCRIPTION OF THE DRAWINGS

The invention shall be explained and described below on the basis of an exemplary embodiment of a planetary drive 1.

FIGS. 3-12 show initial states, or individual parts, of a planet carrier 2 of the planetary drive 1 depicted in FIG. 1, and individual intermediate components of the patent drive produced with the method according to the disclosure; wherein FIG. 3 shows an exemplary embodiment of a metal strip 3 in an elongated initial form, prior to the bending;

FIGS. 4-6 show the completed hollow cylindrical curved metal strip 3 from different perspectives; and FIGS. 7-9 show plate-shaped carrier elements 4 in a side view and in a front view, respectively, FIG. 10 shows an exploded view of the planet carrier 2 depicted in FIG. 11 as a completed intermediate product; and FIG. 12 shows an exploded view of the planetary drive 1 depicted in FIG. 1.

DETAILED DESCRIPTION

Figures 1, 2:
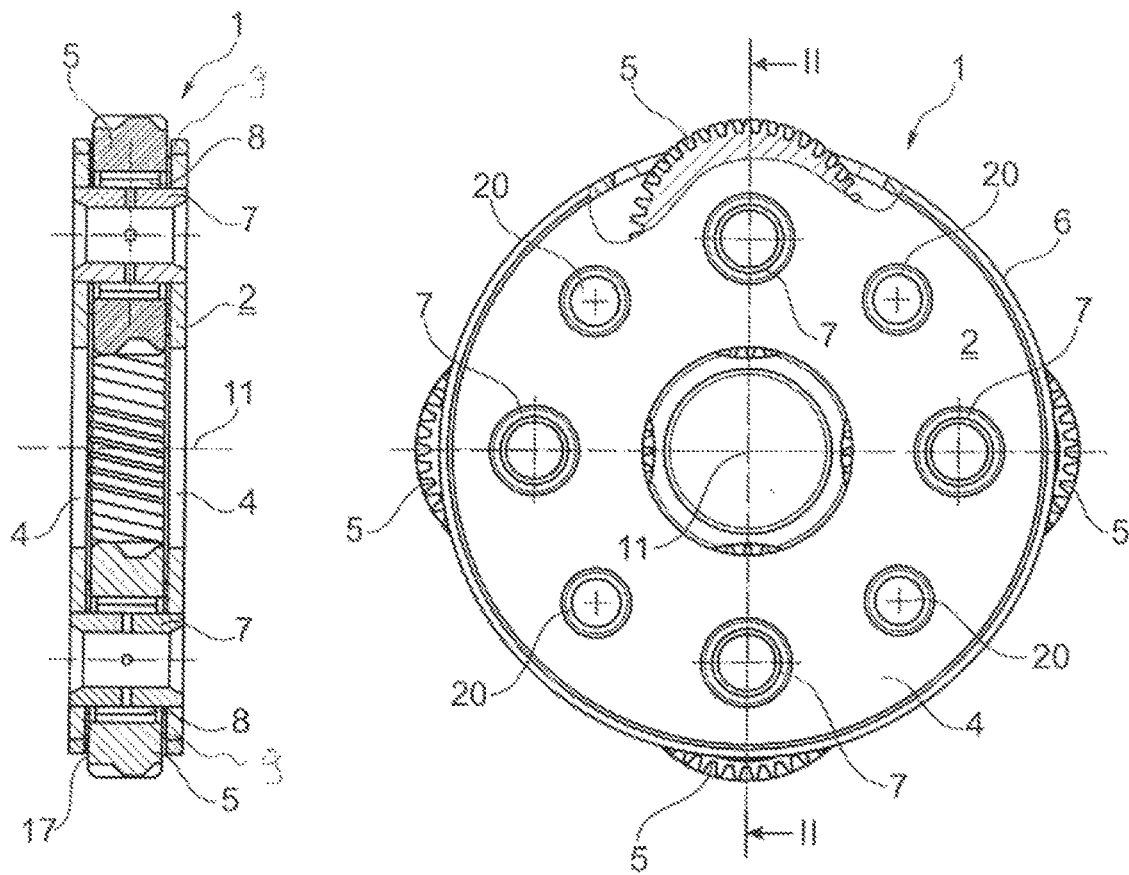
FIG. 1 shows a front view of the planetary drive 1.
FIG. 2 shows a sectional view of the planetary drive 1 depicted in FIG. 1, cut along line II-II according to FIG. 1.
Figure 1A:
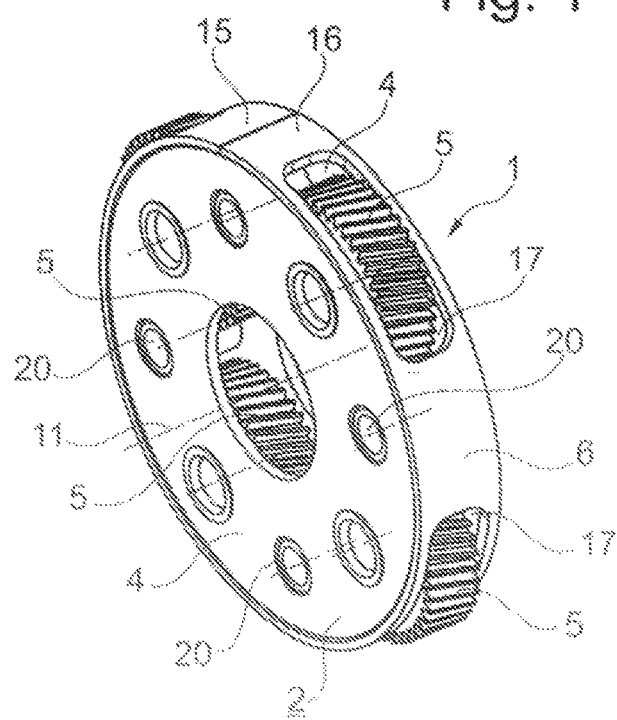
FIG. 1a shows a perspective view of the planetary drive 1 depicted in FIG. 1.

The planetary drive 1 depicted in FIGS. 1, 1a, 2 and 12 comprises the planet carrier 2 and planetary gears 5, planet bolts 7, planet bearing 8, and thrust washers 9. The planet drive 1 is formed by the carrier elements 4, such as plates, and the connecting elements 6. The planet bolts 7 sit in one of the carrier elements 4 at the left and right in each case, at a radial spacing to the central axis 11. One of the planetary gears is rotatably supported on each planet bolt 7 by means of a planet bearing 8. The planet bearings 8 are roller bearings and designed in this case as a needle bearing with a cage. Alternatively, the planet carriers can also be sliding bearings, having ball bearings, or bearings of another arbitrary design. A thrust washer 9 is disposed between the planetary gear 5 and the respective carrier element 4. The planet carrier 2 has radial through holes 17. A planetary gear 5 protrudes radially out of each of the radial through holes 17, beyond the outer contour of the planet carrier 2. Moreover, the planetary drive 1 can be stabilized by connecting bolts 20.

Figure 10:
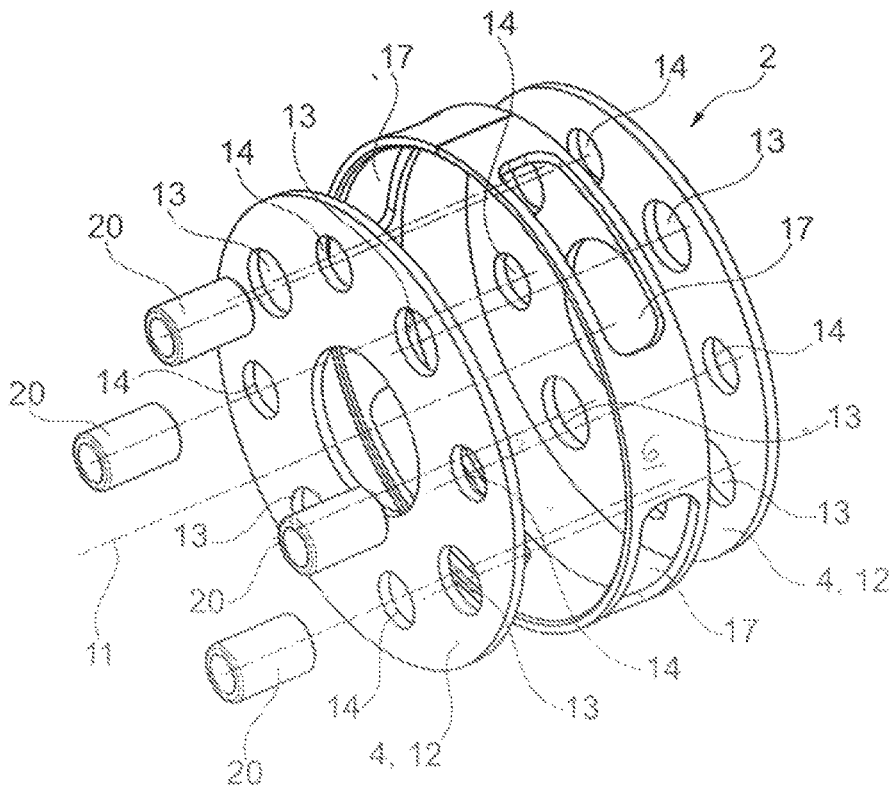
Figure 11:
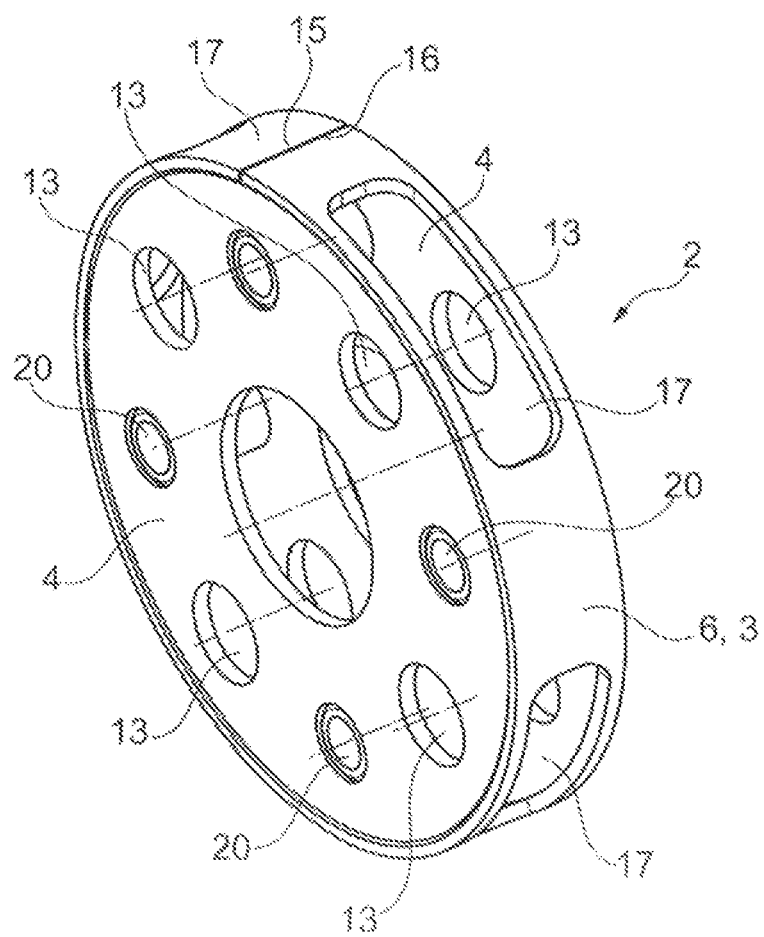

As can be derived from FIGS. 10 and 11, the planet carrier 2 is an intermediate product of a method according to the disclosure, and formed by the two axially opposed carrier elements 4 and the connecting element 6. The carrier elements 4 are axially connected to one another by means of the connecting element 6. The connecting element 6 is a hollow cylindrical, curved metal strip 3 running about the central axis 11 of the planetary drive 1. The metal strip 3 is connected to both carrier elements 4, and sits on a circumferential cylindrical outer contour of the respective carrier element 4. Alternatively, the connecting element 6 can also be disposed axially between the carrier elements 4. The through holes 17 are delimited in the circumferential direction of the planet carrier 2 by cross webs 18 and axially through lateral edges 19 of the metal strip 3 that are curved in the direction of the circumference, about the central axis 11.

It is visible in FIGS. 7, 8, 9 and 10 that the carrier elements 4 are formed by perforated carrier plates 12 having a circular disk shape. The carrier plates 12 are stamped out of sheet metal, preferably steel sheet metal. The perforations 12 in which the planet bolts 7 are received in the completed planetary drive 1, and perforations 14, which may be provided for further connecting elements or as entries for supplying grease, are formed by stamping thereby.

Figure 3:
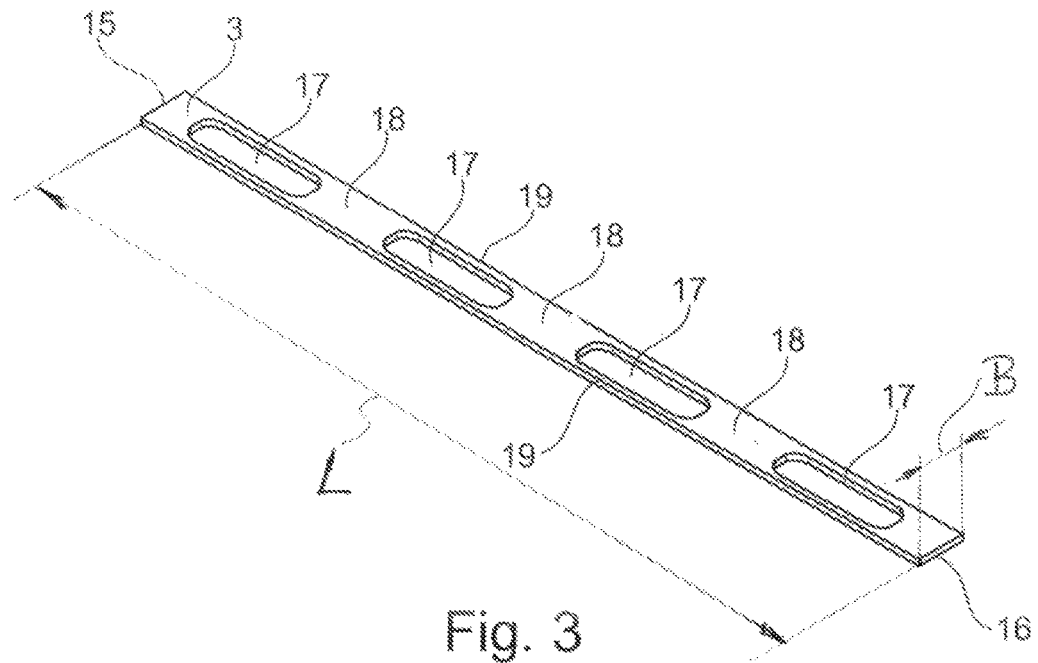
Figures 4, 5, 6:
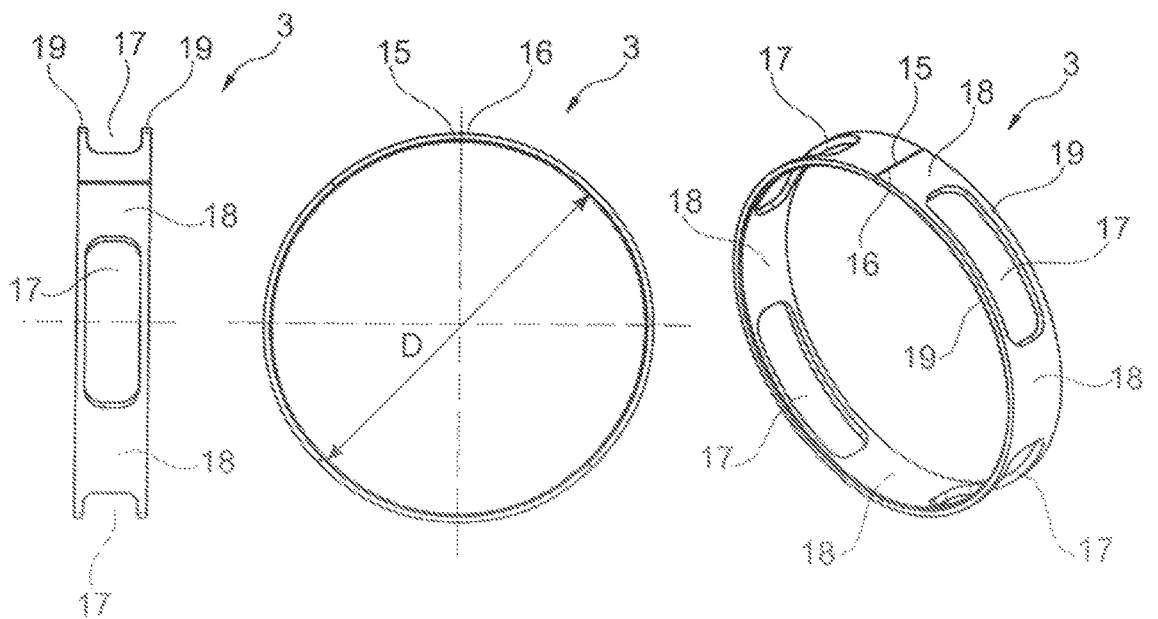
Figure 3A:
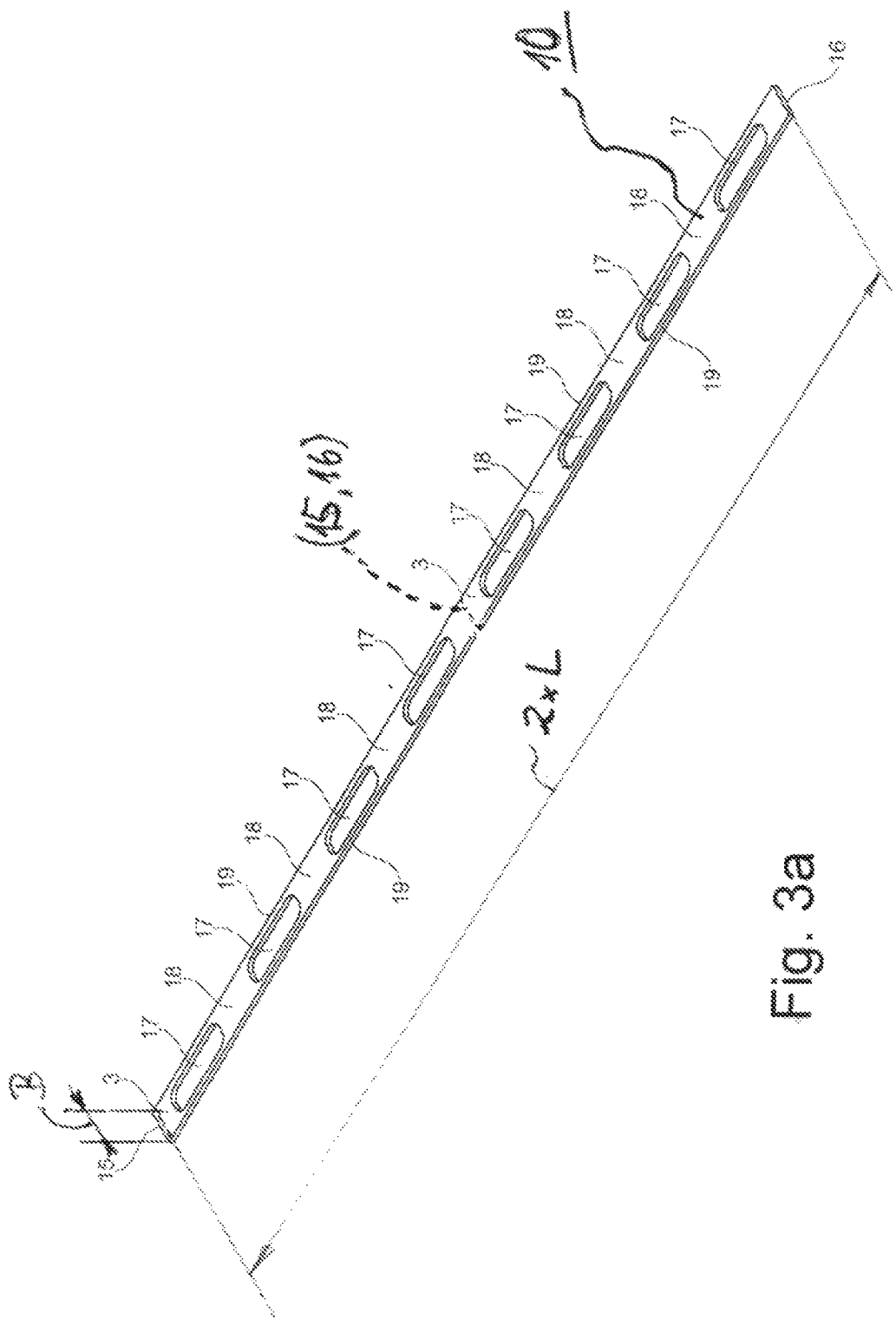
FIG. 3a shows a section of an initial material (blank) in the form of a band material 10, from which two metal strips 3 can be produced.
Figures 7, 8, 9:
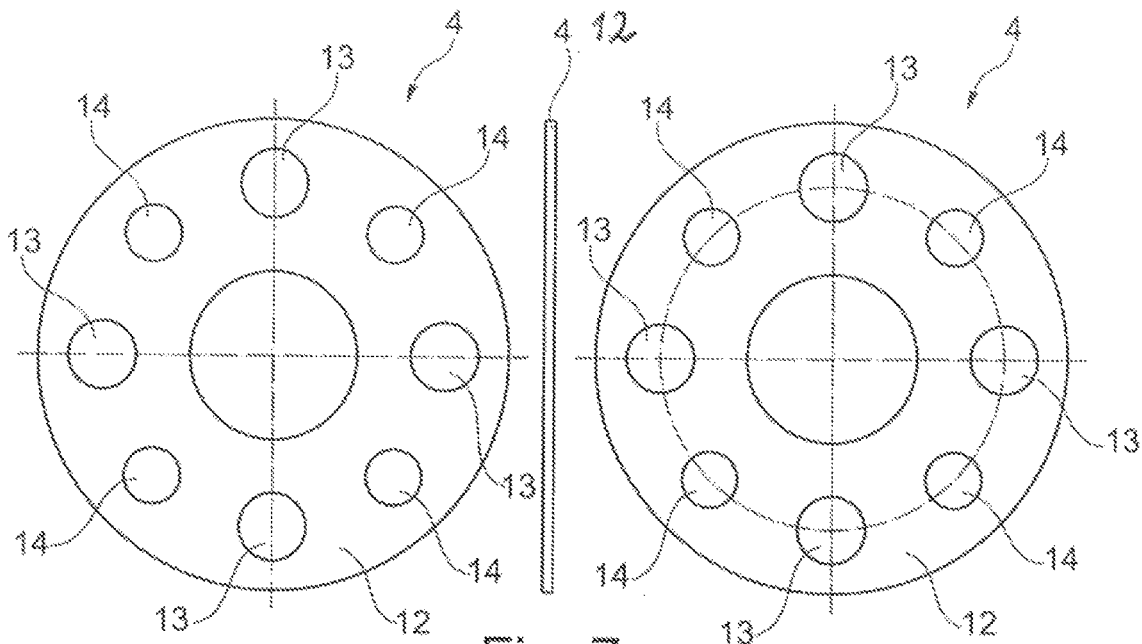

The metal strip 3 is a flat strip in the initial state, as is depicted in FIG. 3. The metal strip 3 is preferably cut from a band material 10 depicted in FIG. 3. The width B of the band material corresponds to the axial width B of the completed connecting element 6. The cut length L between the cut ends 15 and 16 of the metal strip 3 corresponds to the circumference of the connecting element 6 depicted in FIGS. 4, 5 and 6. The band material 10 or the metal strip 3 is preferably perforated prior to bending the metal strip 3, by means of which the through holes 17 are obtained, the inner contours of which are delimited by the material of the metal strip, thus by the cross webs 18 and lateral edges 19.

In the production of the connecting element 6, the metal strip is curved over a bending mandrel, not shown, into a hollow cylindrical final shape, wherein the cut ends 15 and 16 are brought together as bending ends, and subsequently joined through form fitting or preferably through welding. In the final shape depicted in FIGS. 4, 5 and 6, the metal strip 3 has a diameter D, corresponding to the outer diameter of the carrier plates 12, such that is set on the outside when the planet carrier 2 is mounted on the carrier plates 12, and is then connected thereto in a form fitting and/or material bonded manner.

The carrier plates 12 are aligned with one another prior to the attachment of the metal strip in accordance with the depiction according to FIG. 10, such that the respective axes of symmetry of the perforations 13 and 14 are oriented such that they are aligned axially to one another. The metal strip 3 is then attached to the carrier plates 12. Alternatively, the connecting bolts 20 are first installed in the connecting element, or installed simultaneously with the connecting element 6. The connecting bolts 20 are inserted into the carrier plates 4 thereby, such that each of the connecting bolts 20 is inserted into one of the perforations, and inserted into a perforation 14 of the other carrier plate 12 aligned with the first perforation 14.

Figure 12:
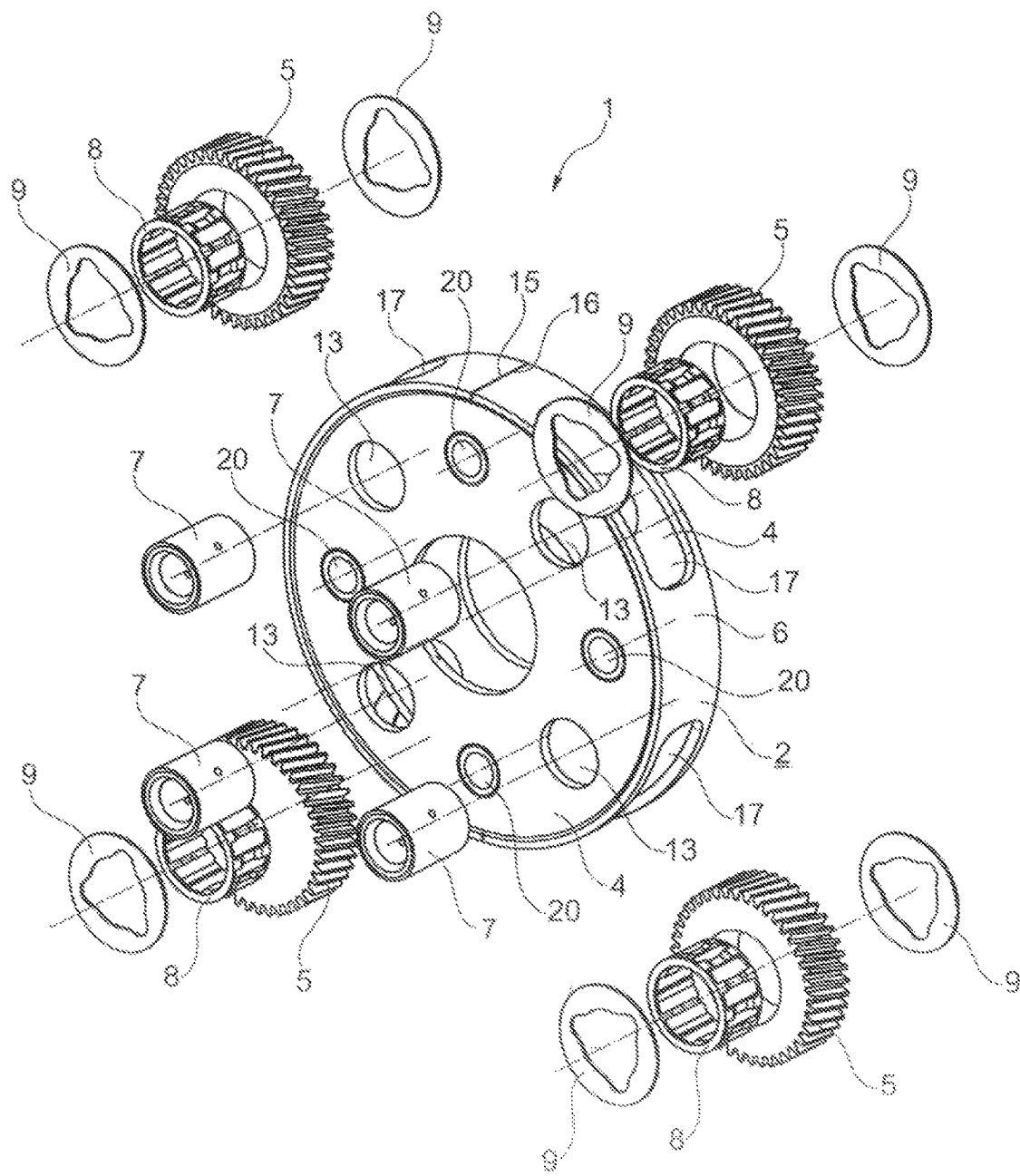

Subsequently, or alternatively, the planet bolts 7 are aligned with the perforations 13 on the completed planet carrier 2, as can be seen in FIG. 12, and inserted into them, as well as through the respective planet carrier 8 and the associated planetary gear 5 thereby.

REFERENCE SYMBOLS

1 planetary drive
2 planet carrier
3 metal strip
4 carrier element
5 planetary gear
6 connecting element
7 planet bolt
8 planet bearing
9 thrust washer
10 band material
11 central axis
12 carrier plate
13 perforation
14 perforation
15 cut end
16 cut end
17 through hole
18 cross web
19 lateral edge
20 connecting bolt

The invention claimed is:

1. A planetary drive comprising:
a planet carrier and planetary gears, wherein the planet carrier includes two axially opposing carrier elements and at least one connecting element, and wherein the carrier elements are axially connected to one another via the connecting element, and retained at an axial spacing,
wherein the planetary gears are supported with a radial spacing about an axially oriented central axis of the planetary drive on the carrier elements, such that the planetary gears protrude radially beyond the connecting element through radial openings formed in the connecting element,
wherein the connecting element is a single metal strip that forms a hollow cylinder that runs around the central axis of the planetary drive, the metal strip having two ends facing one another in the direction of the circumference, and wherein the metal strip is connected to both carrier elements, wherein the openings are delimited by the material of the metal strip, at least in the direction of the circumference.

2. The planetary drive according to claim 1, wherein the openings are perforations formed in the metal strip and wherein the inner contour of the openings is bordered by the material of the metal strip.

3. The planet carrier for a planetary drive according to claim 1, wherein the carrier elements are carrier plates made of sheet metal, wherein the planet carrier is formed by the carrier plates and the metal strip.

4. The planet carrier according to claim 3, wherein the metal strip sits on the outside of a cylindrical outer contour of the respective carrier plate.

5. The planet carrier according to claim 3, wherein a greatest width of the metal strip aligned with the central axis in the axial direction corresponds to the width of a band material, from which the metal strip is produced, wherein the width is equal to or less than the spacing between the carrier plates.

6. A planetary carrier assembly, comprising:
a pair of planet carrier plates disposed about a central axis and spaced from one another, each planet carrier plate defining an outer radial surface;
a plurality of planetary gears supported for rotation about the axis and axially between the planet carrier plates, wherein the planetary gears protrude radially beyond the outer radial surface of the planet carrier plates; and
a single-piece strip formed into a cylindrical shape disposed about the central axis and axially between the pair of planet carrier plates, the strip defining a plurality of openings that receive at least a portion of the planetary gears, wherein the strip is a separate element attached to the planet carrier plates and has two ends connected to one another and facing one another in a direction of a circumference of the strip.

7. The planetary carrier assembly of claim 6, wherein the strip is assembled to the planet carrier plates.

8. The planetary carrier assembly of claim 6, wherein the planet carrier plates each define a circumferential outer surface, and the strip includes a circumferential inner surface that is attached to the circumferential outer surfaces of the planet carrier plates.

9. The planetary carrier assembly of claim 6, wherein the strip is disposed radially outward of the planet carrier plates.

10. The planetary carrier assembly of claim 6, wherein the plurality of openings are perforations cut out of the strip with material of the single-piece cylindrical strip surrounding all sides of the perforations.

11. The planetary carrier assembly of claim 6, wherein the strip is disconnected from the planetary gears.

12. The planetary carrier assembly of claim 6, wherein the strip includes a first edge and a second edge, wherein the first and second cylindrical edges extend continuously in a cylindrical shape about the central axis.

* * * * *